United States Patent
Satsangi et al.

(10) Patent No.: US 12,039,296 B2
(45) Date of Patent: Jul. 16, 2024

(54) SYSTEMS AND METHODS FOR AUTO-CAPTIONING REPOSITORIES FROM SOURCE CODE

(71) Applicant: JPMORGAN CHASE BANK, N.A., New York, NY (US)

(72) Inventors: Yash Satsangi, Tilburg (NL); Shaltiel Eloul, London (GB); Sean Moran, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 61 days.

(21) Appl. No.: 18/054,684

(22) Filed: Nov. 11, 2022

(65) Prior Publication Data

US 2024/0160417 A1     May 16, 2024

(51) Int. Cl.
    *G06F 8/33*          (2018.01)
    *G06F 8/30*          (2018.01)

(52) U.S. Cl.
    CPC ............... *G06F 8/33* (2013.01); *G06F 8/311* (2013.01)

(58) Field of Classification Search
    CPC .................................. G06F 8/311; G06F 8/33
    See application file for complete search history.

(56) References Cited

U.S. PATENT DOCUMENTS

2013/0174124 A1\*   7/2013   Watters ................ G06F 8/71
                                                                717/122
2014/0223416 A1\*   8/2014   Cohen ................. G06F 11/3452
                                                                 717/123
2016/0034512 A1\*   2/2016   Singhal ................. G06F 16/35
                                                                 707/741

(Continued)

FOREIGN PATENT DOCUMENTS

CN         108509199 A   \*   9/2018        ............... G06F 8/43

OTHER PUBLICATIONS

Benjamin Trevett, "Deep Learning Applied to the Assessment of Online Student Programming Exercises" (Year: 2022).\*

(Continued)

*Primary Examiner* — Phillip H Nguyen
(74) *Attorney, Agent, or Firm* — GREENBERG TRAURIG LLP

(57) ABSTRACT

Systems and methods for auto-captioning repositories from source code are disclosed. A method for code repository embedding may include a computer program executed by an electronic device: (1) extracting docstring embeddings, code embeddings, and dependency embeddings from scripts in a repository; (2) applying a machine learning algorithm to each of the docstring embeddings, the code embeddings, and the dependency embeddings, wherein outputs of each of the machine learning algorithms comprises a vector; (3) concatenating the vectors into an output embedding vector; (4) weighting the output embedding vector using an attention mechanism, resulting in a repository representation comprising an abstract vector; (5) generating a plurality of tags for the repository representation or the output embedding vector representing the weights of the tags, using a trained neural network; (6) applying a tags-to-caption transformer to the tags or the output embedding vector, resulting in a caption; and (7) outputting the caption.

20 Claims, 4 Drawing Sheets

(56) References Cited

U.S. PATENT DOCUMENTS

2022/0164175 A1* 5/2022 Masis .................. G06F 3/0484
2022/0391180 A1* 12/2022 Liu ........................ G06F 40/30

OTHER PUBLICATIONS

Tao et al., "A large-scale empirical study of commit message generation: models, datasets and evaluation" (Year: 2022).*
Lherondelle et al., "Topical: Learning Repository Embeddings from Source Code using Attention" (Year: 2022).*

* cited by examiner

SYSTEMS AND METHODS FOR AUTO-CAPTIONING REPOSITORIES FROM SOURCE CODE

BACKGROUND OF THE INVENTION

1. Field of the Invention

Embodiments generally relate to systems and methods for auto-captioning repositories from source code.

2. Description of the Related Art

Open Source-code communities are growing extensively in the recent years. Codebases such as GitHub provide developers a collaborative environment to navigate for relevant codes, follow advancement of technology, learn, and initialize ideas for new applications. With the large content available as opensource, tagging and topic modelling of codes become a crucial part in maintaining and accessing efficiently code-bases communities. In the case of large databases, navigating to a relevant code or library can be challenging. Many libraries remain hidden due to a different level of documentation or lack of tags, or simply because a relevant task can serve only a minor part of the library. Additionally, for maintaining collaborative codebases and understanding the relationships between various libraries and tasks, it is required to analyze the whole database to detect duplication of tasks, trends of software, collaborative opportunities, or even to extract skillset from scripts.

SUMMARY OF THE INVENTION

Systems and methods for auto-captioning repositories from source code are disclosed. In one embodiment, a method for code repository embedding may include: (1) extracting, by a computer program executed by an electronic device, docstring embeddings, code embeddings, and dependency embeddings from scripts in a repository; (2) applying, by the computer program, a machine learning algorithm to each of the docstring embeddings, the code embeddings, and the dependency embeddings, wherein outputs of each of the machine learning algorithms comprises a vector; (3) concatenating, by the computer program, the vectors into an output embedding vector; (4) weighting, by the computer program, the output embedding vector using an attention mechanism, resulting in a repository representation comprising an abstract vector; (5) generating, by the computer program, a plurality of tags for the repository representation or the output embedding vector representing the weights of the tags, using a trained neural network; (6) applying, by the computer program, a tags-to-caption transformer to the tags or the output embedding vector, resulting in a caption; and (7) outputting, by the computer program, the caption.

In one embodiment, the method may also include identifying, by the computer program, the scripts in a code repositories database.

In one embodiment, the computer program may identify the docstring embeddings, the code embeddings, and the dependency embeddings using a Bi-directional Encoder Representations from Transformers.

In one embodiment, the machine learning algorithm may include a gated recurrent unit (GRU) that is part of a Recurrent Neural Network (RNN).

In one embodiment, the attention weights may be trained from a curated dataset collected from a labelled dataset.

In one embodiment, the repository representation may include a numerical representation of the repository.

According to another embodiment, a method for code repository embedding may include: (1) extracting, by a computer program executed by an electronic device, docstring embeddings, code embeddings, and dependency embeddings from scripts in a repository; (2) applying, by the computer program, a machine learning algorithm to each of the docstring embeddings, the code embeddings, and the dependency embeddings, wherein outputs of each of the machine learning algorithms comprises a vector; (3) concatenating, by the computer program, the vectors into an output embedding vector; (4) weighting, by the computer program, the output embedding vector using an attention mechanism, resulting in a repository representation comprising an abstract vector; (5) selecting, by the computer program, a plurality of tags for the repository representation using a reinforcement learning agent; (6) applying, by the computer program, a tags-to-caption transformer to the tags or the output embedding vector, resulting in a caption; and (7) outputting, by the computer program, the caption.

In one embodiment, the method may also include identifying, by the computer program, the scripts in a code repositories database.

In one embodiment, the computer program may identify the docstring embeddings, the code embeddings, and the dependency embeddings using a Bi-directional Encoder Representations from Transformers.

In one embodiment, the machine learning algorithm may include a gated recurrent unit (GRU) that is part of a Recurrent Neural Network (RNN).

In one embodiment, the reinforcement learning agent may include a deep neural network.

In one embodiment, the attention weights may be trained from a curated dataset collected from a labelled dataset.

In one embodiment, the repository representation may include a numerical representation of the repository.

In one embodiment, the method may also include reward shaping the reinforcement learning agent with feedback on the tag selection.

According to another embodiment, a non-transitory computer readable storage medium, may include instructions stored thereon, which when read and executed by one or more computer processors, cause the one or more computer processors to perform steps comprising: extracting docstring embeddings, code embeddings, and dependency embeddings from scripts in a repository; applying a machine learning algorithm to each of the docstring embeddings, the code embeddings, and the dependency embeddings, wherein outputs of each of the machine learning algorithms comprises a vector; concatenating the vectors into an output embedding vector; weighting the output embedding vector using an attention mechanism, resulting in a repository representation comprising an abstract vector; generating a plurality of tags for the repository representation or the output embedding vector representing the weights of the tags, using a trained neural network; applying a tags-to-caption transformer to the tags or the output embedding vector, resulting in a caption; and outputting the caption.

In one embodiment, the docstring embeddings, the code embeddings, and the dependency embeddings may be identified using a Bi-directional Encoder Representations from Transformers.

In one embodiment, the machine learning algorithm may include a gated recurrent unit (GRU) that is part of a Recurrent Neural Network (RNN).

In one embodiment, tags may be generated using a reinforcement learning agent to select the tags.

In one embodiment, the reinforcement learning agent comprises a deep neural network.

In one embodiment, the non-transitory computer readable storage medium may also include instructions stored thereon, which when read and executed by one or more computer processors, cause the one or more computer processors to reward shape the reinforcement learning agent with feedback on the tag selection.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for auto-captioning repositories from source code.

Figure 1:
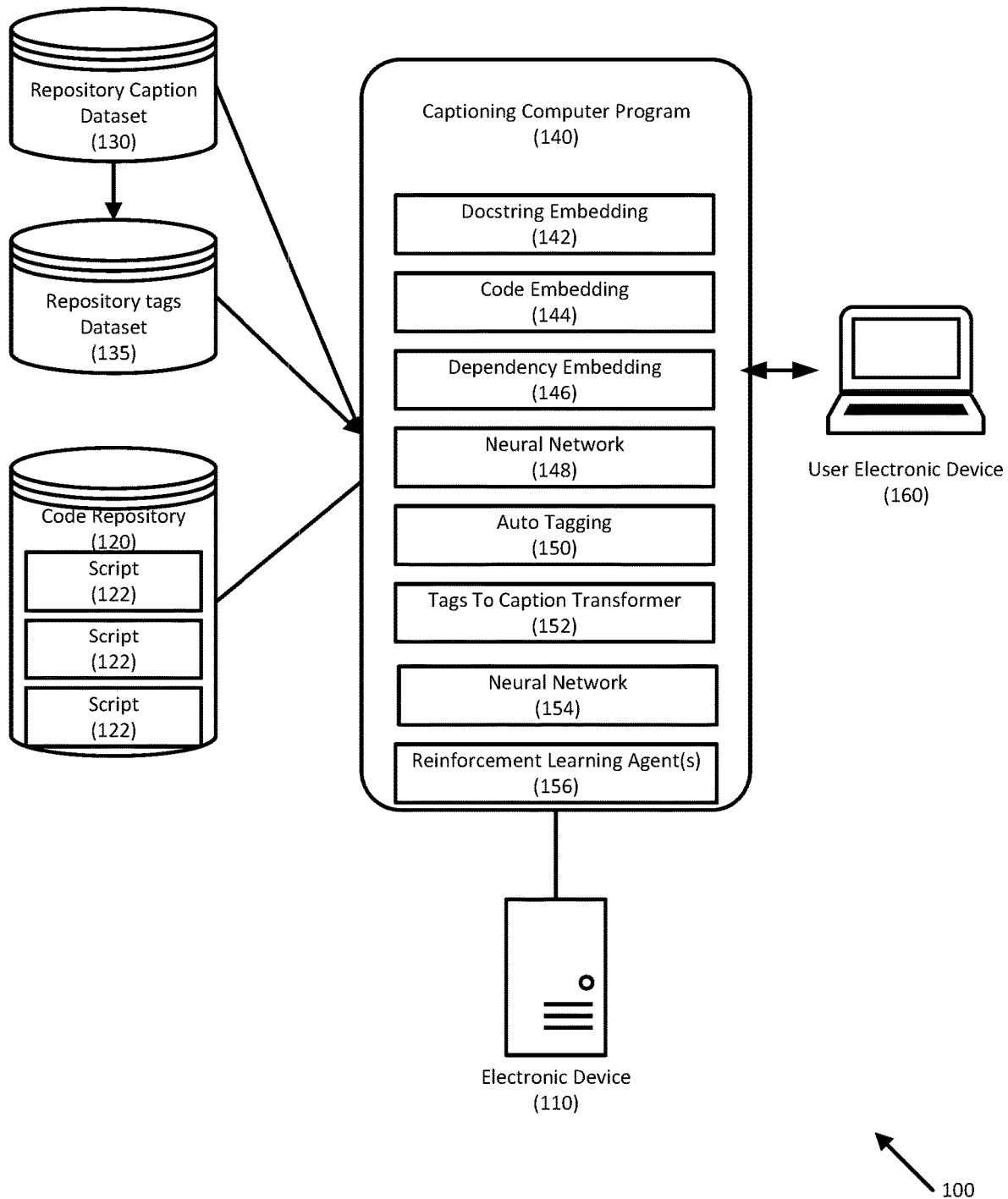
FIG. 1 depicts a system for auto-captioning repositories from source code according to an embodiment.

Referring to FIG. 1, a system for code repository tagging and summarization using attention on multi-embeddings is disclosed according to embodiments. System 100 may include electronic device 110 that may execute captioning computer program 140. In one embodiment, electronic device 110 may be any suitable electronic device, including servers (e.g., cloud-based and/or physical), computers (e.g., workstations, desktops, laptops, notebooks, tablets, etc.), smart devices, etc. Captioning computer program 140 may receive training data from repository caption dataset 130, and may receive one or more scripts 122 from code repository 120.

Captioning computer program 140 may crawl scripts 122 in code repository 120 to generate docstring embeddings 142 (e.g., code comments), code embeddings 144 (e.g., code), and dependency embeddings 146 (e.g., code dependencies). Captioning computer program 140 may use standard or non-standard encoders in scripts 122 of code repository 120. Example of encoders type to generate embedding are Bi-directional Encoder Representations from Transformers (BERT).

Captioning computer program 140 may then apply one or more machine learning neural network units 154, such as a gated recurrent unit (GRU) as part of a Recurrent Neural Network (RNN), to the embeddings, resulting in one or more repository representations.

Docstring embeddings 142, code embeddings 144, and dependency embeddings 146 may be concatenated, and an attention mechanism may apply attention weights to the concatenation. In one embodiment, to train attention weights (e.g., weights of the neural network architecture), captioning computer program 140 may crawl repository caption dataset 130 to collect a curated dataset. Repository caption dataset 130 may contain tags or captions provided by, for example, a developer, a subject matter expert, etc.

In one embodiment, the attention weights may be trained on the curated dataset crawler using an optimization method such as stochastic gradient descent to predict tags associated with code repository 120.

Neural network 148 may be trained with data from repository caption dataset 130 and/or repository tags dataset 135. Embodiments may use existing transformer-based models to extract tags from captions, and may then train neural network 148 on the extracted tags. As noted above, repository caption dataset 130 may include, for example, code, captions, and tags, and repository tags dataset 135 may include keywords extracted from the repository caption dataset 130 using, for example, a transformer (not shown) to extract keywords from repository caption dataset 130.

In one embodiment, neural network 148 may be any suitable neural network, a deep neural network (DNN), or a classifier.

In one embodiment, neural network 148 may include one or more machine learning network units, such as gated recurrent unit (GRU) as part of a Recurrent Neural Network (RNN).

In one embodiment, rather than two separate datasets, a single repository dataset (not shown) may provide captions and tags.

Using the output of neural network 148, captioning computer program 140 may generate tags for code repository 120 using auto tagging module 150. Auto tagging module 150 may select the tags, may apply attention weights to the tags, and then using tags-to-caption transformer 152, such as Key2Text, may generate a summary for code repository 120. The summary may be stored with, for example, code repository 120.

Tags-to-caption transformer 152 may receive, as an input, the tags or their representation in the repository (e.g., the output embedding vector).

In one embodiment, one or more reinforcement learning agents may select the tags.

In one embodiment, one or more reinforcement learning agent(s) 156 may select the tags. Reinforcement learning agent(s) 156 may include a DNN.

System 100 may further include user electronic device 160, which may be any suitable electronic device including computers, smart devices, Internet of Things (IoT) devices, etc. In one embodiment, user electronic device 160 may execute a user computer program that may receive keywords and/or the summary from captioning computer program 140. A user may then provide feedback to captioning computer program 140 which may be used to train neural network 148.

Figure 2:
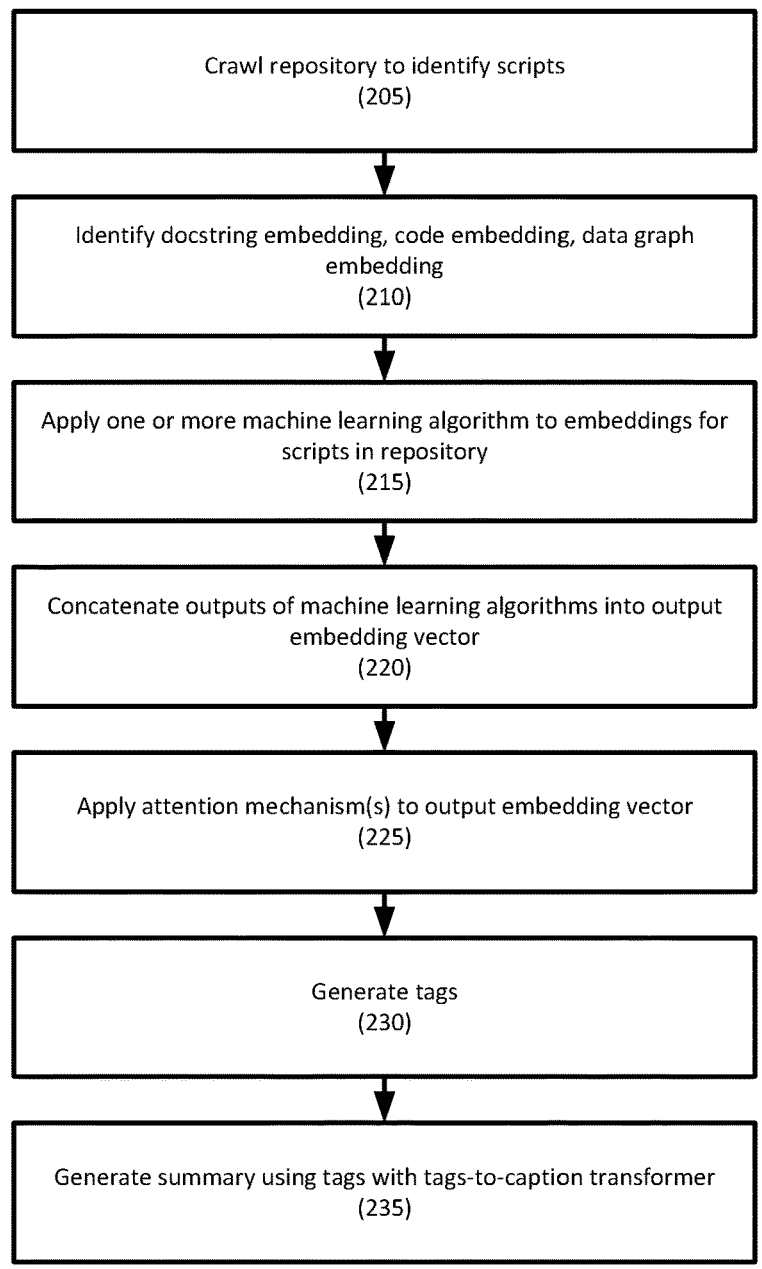
FIG. 2 depicts a method for auto-captioning repositories from source code according to an embodiment.

Referring to FIG. 2, a method for code repository tagging and summarization using attention on multi-embeddings is disclosed according to embodiments.

In step 205, a computer program may crawl a repository to identify scripts in the repository.

In step 210, the computer program may extract docstring embeddings, code embeddings, and dependency embeddings from the scripts in the code repository. For example, the computer program may use standard or non-standard encoders. Example of encoders that may be used to generate the embeddings include the Bi-directional Encoder Representations from Transformers (BERT).

In step 215, the computer program may apply one or more trained machine learning algorithm to the embeddings for scripts in repository. For example, the computer program may identify docstring embeddings (e.g., code comments), code embeddings (e.g., code), and dependency embeddings (e.g., code dependencies). Examples of a machine learning algorithm include a gated recurrent unit (GRU) as part of a Recurrent Neural Network (RNN).

In one embodiment, the machine learning algorithm may output a vector that is the result of processing the docstring, the code, and the dependency embeddings.

In one embodiment, the machine learning algorithms may be trained with historical data from a repository captions dataset.

In step 220, the computer program may concatenate the outputs of the machine learning algorithms into an output embedding vector, and in step 225, the computer program may apply one or more attention mechanism to weigh the output embedding vector. The attention weights may be trained from a curated dataset collected from a labelled dataset.

The result of the application of the attention weights is a repository representation. The repository representation may be an abstract vector, such as a numerical representation of the repository.

In step 230, the computer program may generate tags for the repository. Examples are disclosed in U.S. Provisional Patent Application Ser. No. 63/236,488 and U.S. patent application Ser. No. 17/821,643, the disclosures of which are hereby incorporated, by reference, their entireties. For example, embodiments may use a neural network to generate the tags.

In step 235, using a tags-to-caption transformer, the computer program may generate a summary for the tags or their representation vector in the repository (e.g., the output embedding vector).

For example, Key2Text may be used.

In one embodiment, reinforcement learning may be used. For example, one or more reinforcement learning agents may be provided to select a set of keywords for the scripts in a repository. In one embodiment, the reinforcement learning agents may select keywords, which replaces the neural network that generates tags from repository embeddings. Once the keywords are selected, which may be transformed into a summary. The summary may be output, and then a user may provide feedback to the summary. The user feedback may be used to train the neural network, and the process may continue until positive feedback is received or any other suitable time.

In one embodiment, the keywords may be used directly to generate the summary.

In one embodiment, reward shaping may be used. For example, a plurality of reinforcement learning agents may be trained in parallel. Reward shaping may accelerate the training of the reinforcement learning agent by providing additional feedback in form of tags from the repository caption dataset and the repository tags dataset. Reward shaping may accelerate the training of reinforcement learning agents, and the tags may be provided by the repository caption dataset and the repository tags dataset.

Embodiments may provide the following: deep embeddings for topic modelling, including the use of an attention mechanism, and combining three domains of the code—docstring, full-dependency graph, and source code; scalability to large datasets and numbers of labels; the use of a crawler to introduce new topics into the training set and monitor the labels repartition; and the use of embeddings for multiple downstream tasks, such as text summarizing, tagging, etc.

Embodiments may provide the following: deep embeddings for topic modelling, including the use of an attention mechanism, and combining 3 domains of the code: docstring, full-dependency graph and source code; scalability to large datasets and numbers of labels; the use of a crawler to introduce new topics into the training set and monitor the labels repartition; and the use of embeddings for multiple downstream tasks, such as text summarizing, tagging, etc.

Figure 3:
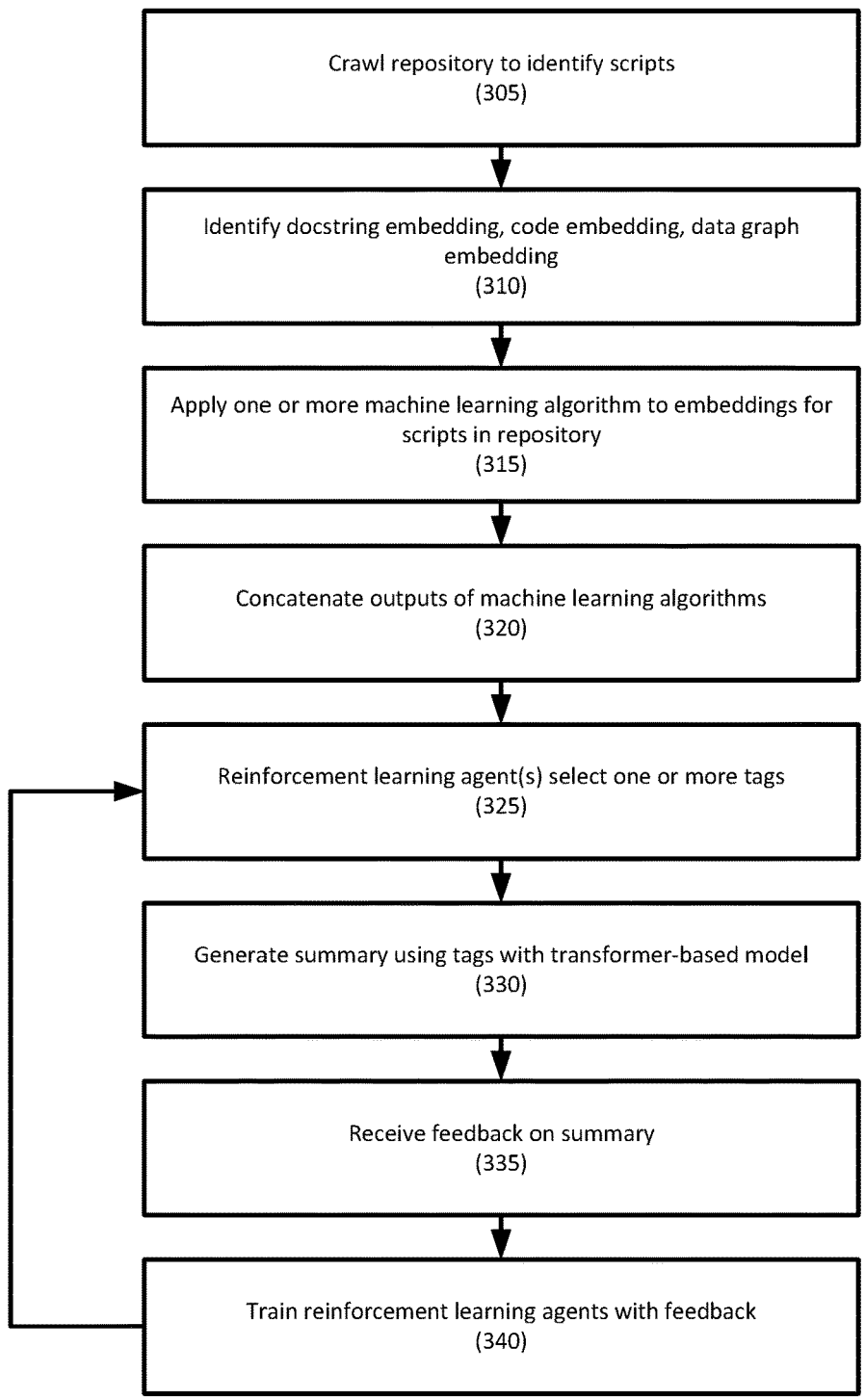
FIG. 3 depicts a method for auto-captioning repositories from source code according to an embodiment.

FIG. 3 depicts a method for auto-captioning repositories from source code according to an embodiment.

In step 305, a computer program may crawl a repository to identify scripts in the repository. This may be similar to step 205, above.

In step 310, the computer program may extract docstring embeddings, code embeddings, and dependency embeddings from the scripts in the code repository. This may be similar to step 210, above.

In step 315, the computer program may apply one or more trained machine learning algorithm to the embeddings for scripts in repository. This may be similar to step 215, above.

In step 320, the computer program may concatenate the outputs of the machine learning algorithms. This may be similar to step 220, above.

In step 325, a reinforcement learning agent may select one or more tags for the concatenated outputs of the machine learning algorithm. For example, one or more reinforcement learning agents may select a set of keywords for the scripts in a repository. The reinforcement learning agent may be a DNN, and may be trained to select the tags.

In step 330, using a tags-to-caption transformer, the computer program may generate a summary for the selected tags. For example, Key2Text may be used.

In step 335, the computer program may receive feedback on the tag selection, and in step 340, the computer program may use the feedback to update the agents. In one embodiment, reward shaping may be used to update the agents.

Figure 4:
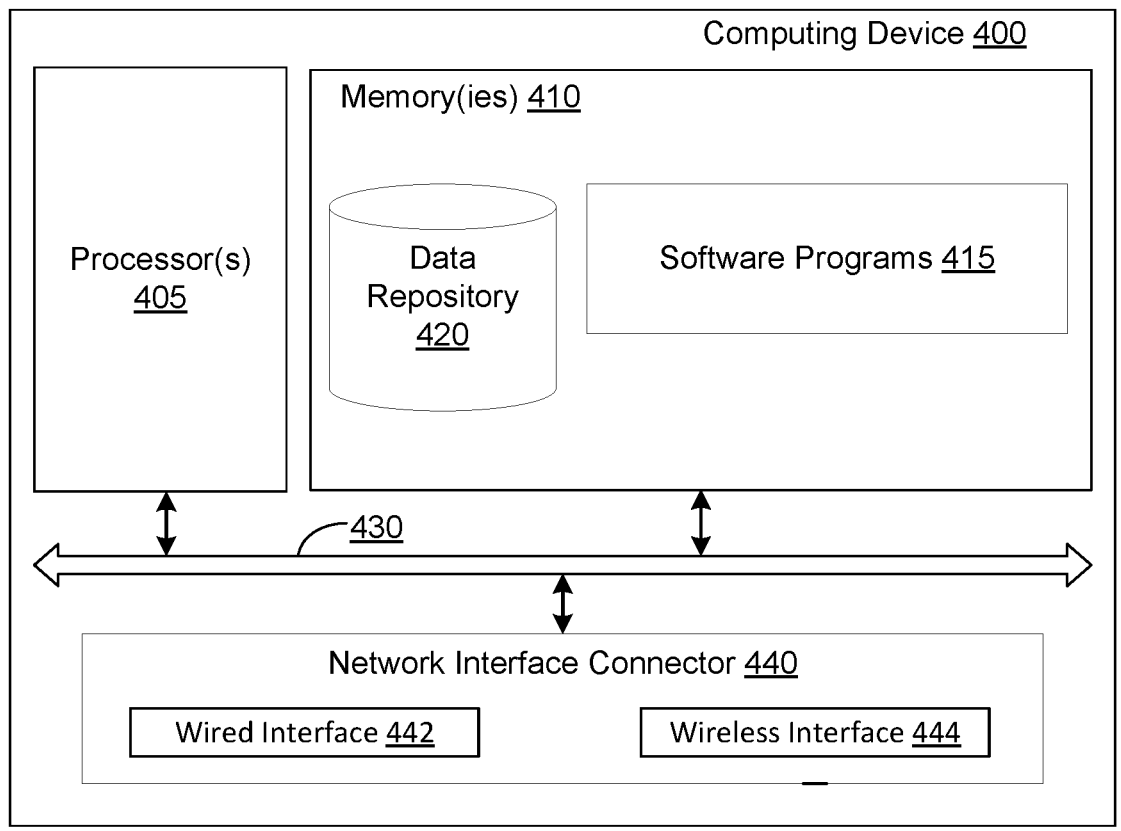
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for code repository embedding, comprising:
extracting, by a computer program executed by an electronic device, docstring embeddings, code embeddings, and dependency embeddings from scripts in a repository;
applying, by the computer program, a machine learning algorithm to each of the docstring embeddings, the code embeddings, and the dependency embeddings, wherein outputs of each of the machine learning algorithms comprises a vector;
concatenating, by the computer program, the vectors into an output embedding vector;
weighting, by the computer program, the output embedding vector using an attention mechanism, resulting in a repository representation comprising an abstract vector;
generating, by the computer program, a plurality of tags for the repository representation or the output embedding vector representing the weights of the tags, using a trained neural network;
applying, by the computer program, a tags-to-caption transformer to the tags or the output embedding vector, resulting in a caption; and
outputting, by the computer program, the caption.

2. The method of claim 1, further comprising:
identifying, by the computer program, the scripts in a code repositories database.

3. The method of claim 1, wherein the computer program identifies the docstring embeddings, the code embeddings, and the dependency embeddings using a Bi-directional Encoder Representations from Transformers.

4. The method of claim 1, wherein the machine learning algorithm comprises a gated recurrent unit (GRU) that is part of a Recurrent Neural Network (RNN).

5. The method of claim 1, wherein the attention weights are trained from a curated dataset collected from a labelled dataset.

6. The method of claim 1, wherein the repository representation comprises a numerical representation of the repository.

7. A method for code repository embedding, comprising:
extracting, by a computer program executed by an electronic device, docstring embeddings, code embeddings, and dependency embeddings from scripts in a repository;
applying, by the computer program, a machine learning algorithm to each of the docstring embeddings, the code embeddings, and the dependency embeddings, wherein outputs of each of the machine learning algorithms comprises a vector;
concatenating, by the computer program, the vectors into an output embedding vector;
weighting, by the computer program, the output embedding vector using an attention mechanism, resulting in a repository representation comprising an abstract vector;
selecting, by the computer program, a plurality of tags for the repository representation using a reinforcement learning agent;
applying, by the computer program, a tags-to-caption transformer to the tags or the output embedding vector, resulting in a caption; and
outputting, by the computer program, the caption.

8. The method of claim 7, further comprising:
identifying, by the computer program, the scripts in a code repositories database.

9. The method of claim 7, wherein the computer program identifies the docstring embeddings, the code embeddings, and the dependency embeddings using a Bi-directional Encoder Representations from Transformers.

10. The method of claim 7, wherein the machine learning algorithm comprises a gated recurrent unit (GRU) that is part of a Recurrent Neural Network (RNN).

11. The method of claim 7, wherein the reinforcement learning agent comprises a deep neural network.

12. The method of claim 7, wherein the attention weights are trained from a curated dataset collected from a labelled dataset.

13. The method of claim 7, wherein the repository representation comprises a numerical representation of the repository.

14. The method of claim 7, further comprising:
reward shaping the reinforcement learning agent with feedback on the tag selection.

15. A non-transitory computer readable storage medium, including instructions stored thereon, which when read and executed by one or more computer processors, cause the one or more computer processors to perform steps comprising:
extracting docstring embeddings, code embeddings, and dependency embeddings from scripts in a repository;
applying a machine learning algorithm to each of the docstring embeddings, the code embeddings, and the dependency embeddings, wherein outputs of each of the machine learning algorithms comprises a vector;
concatenating the vectors into an output embedding vector; weighting the output embedding vector using an attention mechanism, resulting in a repository representation comprising an abstract vector;
generating a plurality of tags for the repository representation or the output embedding vector representing the weights of the tags, using a trained neural network;
applying a tags-to-caption transformer to the tags or the output embedding vector, resulting in a caption; and
outputting the caption.

16. The non-transitory computer readable storage medium of claim 15, wherein the docstring embeddings, the code embeddings, and the dependency embeddings are identified using a Bi-directional Encoder Representations from Transformers.

17. The non-transitory computer readable storage medium of claim 15, wherein the machine learning algorithm comprises a gated recurrent unit (GRU) that is part of a Recurrent Neural Network (RNN).

18. The non-transitory computer readable storage medium of claim 15, wherein tags are generated using reinforcement learning agent to select the tags.

19. The non-transitory computer readable storage medium of claim 18, wherein the reinforcement learning agent comprises a deep neural network.

20. The non-transitory computer readable storage medium of claim 18, further including instructions stored thereon, which when read and executed by one or more computer processors, cause the one or more computer processors to reward shape the reinforcement learning agent with feedback on the tag selection.

* * * * *